(12) United States Patent
Aoyama

(10) Patent No.: US 7,177,013 B2
(45) Date of Patent: Feb. 13, 2007

(54) RANGING APPARATUS, RANGING METHOD, AND RANGING PROGRAM

(75) Inventor: Chiaki Aoyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 178 days.

(21) Appl. No.: 10/813,714

(22) Filed: Mar. 31, 2004

(65) Prior Publication Data

US 2004/0207831 A1  Oct. 21, 2004

(30) Foreign Application Priority Data

Apr. 15, 2003  (JP) .............................. 2003-110457

(51) Int. Cl.
*G01C 3/00* (2006.01)

(52) U.S. Cl. .................... 356/4.04; 356/4.01; 356/4.02; 356/4.03

(58) Field of Classification Search ................ 356/4.04
See application file for complete search history.

(56) References Cited

U.S. PATENT DOCUMENTS

| | | | | |
|---|---|---|---|---|
| 5,561,526 A | * | 10/1996 | Huber et al. ................ | 356/604 |
| 6,211,911 B1 | * | 4/2001 | Komiya et al. .......... | 348/218.1 |
| 6,229,625 B1 | * | 5/2001 | Nakatsuka .................. | 358/1.9 |
| 7,015,954 B1 | * | 3/2006 | Foote et al. ............. | 348/218.1 |
| 2002/0180931 A1 | * | 12/2002 | Dick et al. .................. | 351/211 |
| 2002/0191839 A1 | * | 12/2002 | Ito et al. ..................... | 382/154 |
| 2002/0196423 A1 | * | 12/2002 | Shima ....................... | 356/3.14 |
| 2004/0080661 A1 | * | 4/2004 | Afsenius et al. ............ | 348/345 |

FOREIGN PATENT DOCUMENTS

JP  11-355813  12/1999

* cited by examiner

*Primary Examiner*—Thomas H. Tarcza
*Assistant Examiner*—Luke Ratcliffe
(74) *Attorney, Agent, or Firm*—Carrier, Blackman & Associates, P.C.; Joseph P. Carrier; William D. Blackman

(57) ABSTRACT

A ranging apparatus which determines distances to objects by using planar positions of the objects in images which are obtained by cameras which take the images, plural distortion correction tables used to correct distortion of images taken by the cameras wherein the distortion correction are made for progressively determined ranging distances of a target object, a corrective computer which generates corrected images using the distortion correction tables, being corrected for eliminating distortion caused by optical systems of the cameras, corresponding to the progressively determined ranging distances in which the images are taken by the cameras, a selector which selects a most appropriately corrected image among the corrected images and a ranging computer which computes a distance to the object viewed in the selected corrected image.

12 Claims, 8 Drawing Sheets

FIG.2A

Distortion Correction Table

| u-axis | v-axis | du | dv |
|---|---|---|---|
| 0 | 0 | 18 | 25 |
| 1 | 0 | 18 | 25 |
| 3 | 0 | 18 | 24 |
| . | . | . | . |
| . | . | . | . |
| . | . | . | . |
| 768 | 0 | . | . |
| 0 | 1 | . | . |
| 1 | 1 | . | . |
| . | . | . | . |
| . | . | . | . |

FIG.2B

Directional Mapping Table

| u'-axis | v'-axis | $\alpha_1$ | $\alpha_2$ | $\gamma$ |
|---|---|---|---|---|
| 0 | 0 | 45.51 | 58.23 | 24.81 |
| 1 | 0 | 45.50 | 58.22 | 42.81 |
| 3 | 0 | 45.50 | 58.22 | 24.81 |
| . | . | . | . | . |
| . | . | . | . | . |
| . | . | . | . | . |
| 768 | 0 | . | . | . |
| 0 | 1 | . | . | . |
| 1 | 1 | . | . | . |
| . | . | . | . | . |
| . | . | . | . | . |

RANGING APPARATUS, RANGING METHOD, AND RANGING PROGRAM

FIELD OF THE INVENTION

The present invention relates to apparatus, a method and a program to carry out ranging to determine a distance from an observing point to an object using an image which is taken by cameras.

BACKGROUND OF THE INVENTION

In the ranging of an object, that is a measurement of the distance from the observing point to the object, stereo cameras such as CCD (Charge Coupled Devices) image sensor cameras or CMOS image sensor cameras are widely used. However in the use of such stereo cameras, various measurement errors in the system are accumulated to affect the resultant precision of the ranging measurement.

For example, an image distortion (called "distortion", hereinafter) is one of such measurement errors. The distortion is a deformation of the image taken by a camera as classified as a pin cushion distortion or a barrel distortion. The former is a deformation into a pin cushion shape and the latter a barrel shape both against the rectangular original shape. When the lens system is composed of several lenses, the deformation is not a simple pin cushion distortion or a simple barrel distortion, but a complex of these distortions so that the straight line turns into a wavy line. Such distortion and complex distortion are generated even by a protective glass plate or a protective plastic cover attached to the front position before the lens system.

Using such distorted images, the ranging by the stereo cameras generates errors in the result of computed distance to the object.

It is possible to reduce the distortion not only by the lens composition or the aperture position in the lens system but also by direct correction of the image obtained after image acquisition using the cameras.

A conventional method has been applied to a simply increasing distortion lens system. If the distortion increases in accordance with the distance from the center of the lens system (which is the center of the acquired image), the distortion in the arbitral point on the image can be given in a simple increasing function against the distance r from the center of the image. A simple determination of the distortion is carried out by using a checker pattern which has black and white small squares aligned side by side. The images of the checker pattern charts are taken by a camera against the distance of the location of the checker separated from the camera. Then the distortion observed in the checker pattern through the camera system is given against the distance to the object (which is actually the position of the checker pattern chart). Plural correspondences between the distortion and the distance can generate an approximate function to relate the distortion and the distance. As the results, it is possible to remove the distortion from the image by using reverse computation carried out by such approximate function and the information of the distance to the object (see, for example, reference 1).

However, this distortion removal method can be realized by using the relation between squares on the actual checker pattern and the distorted on-image picture elements which compose the checker pattern. Actually once such relation is memorized in a memory device, it is possible to remove the distortion from the acquired image by using the relation retrieved from the memory device not by using the reverse function.

Reference 1:
Page 3 and the FIG. 5, etc. in JP, H11-355813, A (1999)

BRIEF SUMMARY OF THE INVENTION

The distortion depends on the distance from the camera to a target object. Therefore, it is necessary to fix and determine the lens distortion and to measure the distance to the object for the purpose of removing the distortion of the images which are to be used for advertisement or art appreciation. These parameters such as the lens distortion and the distance to the object serve to make an appropriate distortion correction. However, the distortion correction is not uniquely determined only by distortion information of the lens system since the distortion depends on the distance to the object which is unknown in the acquired image which is taken through the lens.

The FIG. 8 shows the correction errors which are calibrated under an assumed distance to the object where the particular distances to the object are 0.35 meter, 0.5 meter, 0.71 meter and so on are chosen. For example, it is possible to completely remove the distortion of the image after the correction necessary for the image of the object is taken at 1 meter apart from the camera when the object is put 1 meter apart from the camera position as well. However the correction error is generated when the distance to the object differs from 1 meter because the calibrated correction at 1 meter distance cannot be applied to other distances of the object since it makes over correction of the object for such distances.

The present invention for ranging apparatus, a ranging method and a ranging program has an advantage of a capability to determine the distance of the object as well as to correct the distortion of the image by using the image taken by stereo cameras.

The present invention relates to a ranging apparatus that calculates the ranging distance by using the object images taken by the plural cameras. The distortion correction is carried out for the acquired images for each of the cameras. Plural distortion correction means or devices are set for the ranging distances which are progressively set on the ranging distances. All of the acquired images are corrected by means of a corrective computation means or device for all of the ranging distances which are progressively set. Then, the corrected images are generated from the acquired images. The most appropriate correction among the corrected images is selected by a corrected image selection means or device. The ranging distance of the object of which image has been taken by the cameras is calculated by a ranging computation means or device.

For the ranging apparatus regarding the present invention, plural distortion correction means or devices are made for the ranging distances of the object in a progressive set as 10–20 cm, 20–35 cm, 35–55 cm, etc. The corrective computation means or device carries out to generate plural corrected images computed by using all distortion correction means or devices provided for the progressively set ranging distances. In this computation, plurality of the corrected images equals to the number of corrective computation means or devices multiplied by the quantity of cameras used for the image acquisition. Among these corrected images, the corrected image which is most appropriately corrected is selected by a corrected image selection means or device. The corrected image selected in this process is used for the determination of the ranging distance which is computed by a ranging computation means or device. The precise distance can be finally obtained after this series of processes.

Further in the present invention, an image acquired by one of the plural cameras is corrected to remove the distortion therein and can be used as a reference image thereafter. Comparison images are created by the correction, being corrected against the same ranging distance, done for the image acquired by another of the plural cameras. The positions of the picture elements that compose and present the object in the reference image are specified. Furthermore, the object is specified in the picture elements which are shifted by the parallaxes corresponding to the ranging distances progressively set for the distortion correction. The corrected image that shows the best coincidency between the picture elements composing the object on the reference image and those composing the object on the corrected image is selected.

Further in the present invention, the picture elements of the object in the reference image are specified and the object image is searched on the position of the picture elements which locates apart by the parallaxes against the position defined on the comparison image. The smaller the parallax is the further the ranging distance is or reverse wise. For the comparison image, the distance of the object of which image is acquired is set in a certain range where the image correction distance is done for the distance. Therefore, if the comparison image is appropriate, the image of the object should locate in the position of the picture element that is shifted by the parallax having a range corresponding to the ranging distance of the image acquisition. The coincidence regarding the object between those on the acquired image and those on the shifted picture elements is evaluated for every comparison image and the coincidence shows a peak for the comparison image that has the most appropriate distortion correction. This results into a determination of the optimum corrected image.

According to the apparatus that has the means to realize the above determination sequence and method, an optimum comparison image, that is, the image corrected by appropriate correction means or device can be selected by searching the object in only limited picture elements where the coincidence is only evaluated.

The present invention comprises several steps to compute the ranging distance. The first step is to acquire the image of a target object by using plural cameras. The second step is to determine plural corrected images by computing to eliminate the distortion with the distortion correction means or devices obtained for the ranging distances progressively set on beforehand. The third step is to select the corrected image that has the least distortion. The fourth step to compute the ranging distance of the object in the corrected image based on the corrected image.

When this method is applied to the determination of the ranging distance, the effects of the measurement step are obtained as follows. Plural images can be acquired by the plural cameras in the first step. Plural corrected images can be obtained after the correction for each acquired image done by all of the distortion correction means or devices in the second step. The corrected image that has the least distortion among the plural corrected images is selected in the third step. The distance of the object is computed on the basis of corrected images that are appropriately corrected for the distortion in the fourth step.

As the result, high precision of the ranging is obtained since the distance of the object is computed on the basis of corrected images that are appropriately corrected for the distortion.

All of the means or devices and the steps can be executed by a computer program that is installed in computer hardware for distortion correction.

BRIEF DESCRIPTION OF THE DRAWINGS

FIG. 2A shows an example of the distortion correction table.

FIG. 2B shows an example of the directional mapping table.

DETAILED DESCRIPTION OF THE INVENTION

An explanation of an embodiment of the present invention is set forth in relation to the appended figures.

Figure 1:
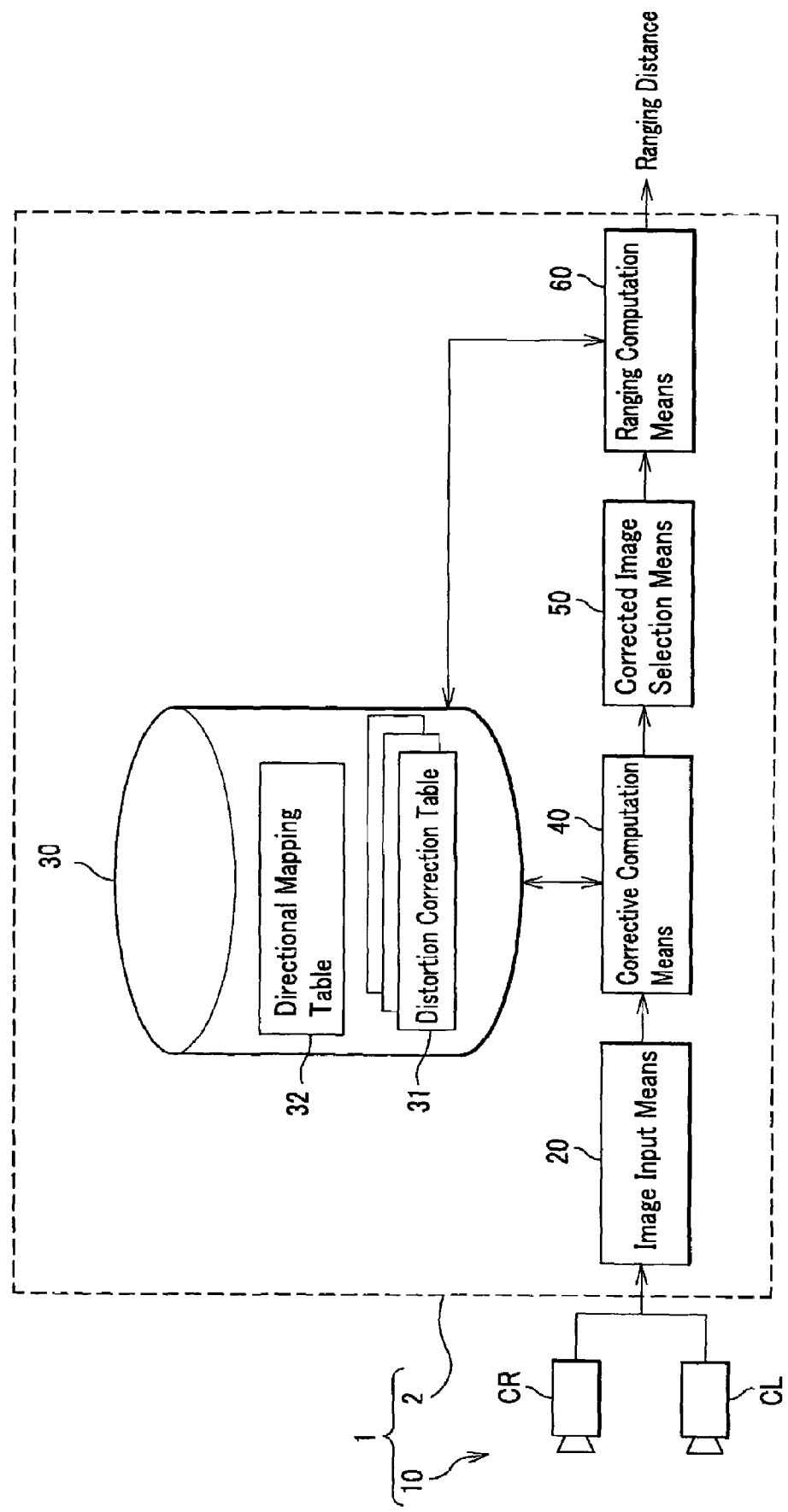
FIG. 1 is a functional block diagram that shows the ranging apparatus of the present invention.

FIG 1 shows the functional block diagram of an embodiment of the ranging apparatus. The ranging apparatus 1 comprises cameras 10, an image input means 20, a memory device 30, a corrective computation means 40, a corrected image selection means 50 and a ranging computation means 60.

The cameras 10 compose of a right camera CR and a left camera CL placed side by side and are directed to the object. The cameras CR and CL are constructed with lens systems and CCD image sensors. The view is converged on to the CCD image sensor through the lens system as an image. Then, the image signal is sent out to the image input means 20. The present embodiment shows two cameras, however it is possible to use three or more cameras for the ranging apparatus.

The image input means 20 is to convert the image signal that the cameras 10 have acquired to digital image data so that the computer can handle the acquired image.

The memory device 30 is a hard disk drive that stores and retrieves the data base necessary for the operation of the ranging apparatus and the image data under processing and that works as a system disk for the computer operation as well. The memory device 30 stores a distortion correction table 31 that is used for eliminating the distortion of the image acquired by the cameras CR and CL and a vector or directional mapping table 32 that is used for the computation of the distance to the object.

The distortion correction table 31 shows the shift necessary for the distortion correction in a unit of picture element (du, dv) against the position (u, v) on the image data acquired by the camera CR and CL picture. This distortion correction table 31 is made for each of cameras CR and CL.

Since the distortion correction depends on the distance to the object, the distortion correction table 31 has been made against every distance in a way of progressive step that is predetermined for each of the cameras CR and CL. For example, the distances as 0.1–0.2 meters, 0.2–0.3 meters, 0.35–0.55 meters, . . . , 30 meters and infinity are selected and the distortion correction tables are made for all of these for progressively determining the distance.

Figure 3:
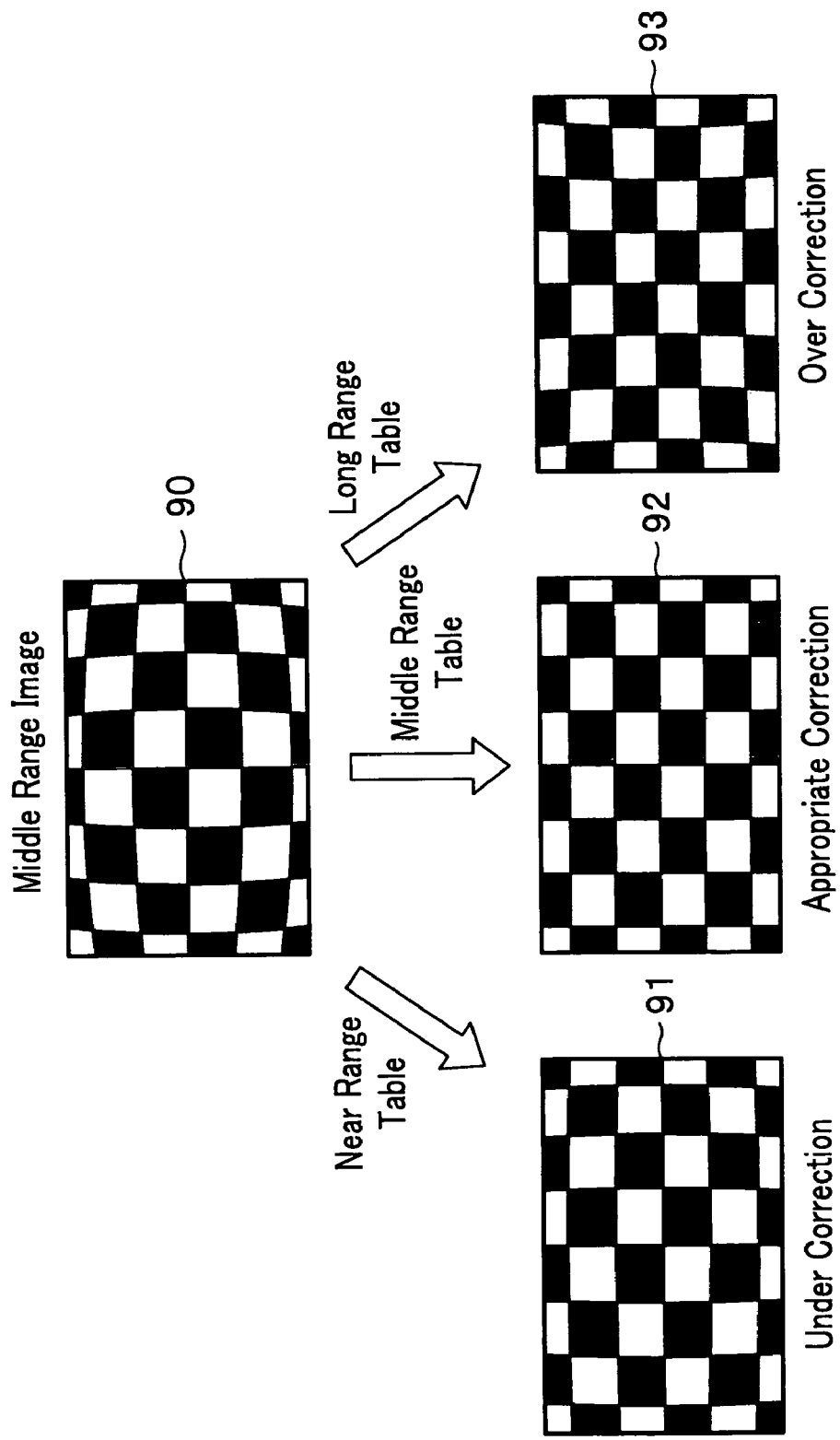
FIG. 3 shows an example of the distortion correction.

The degree of the correction by using the distortion correction table is, for example, shown in FIG. 3. Let the image of checker pattern 90 be acquired by the camera 10 in the middle range distance and the barrel distortion be generated, an appropriate correction is obtained when a distortion correction table made for a middle range distance is used for the distortion correction as shown by checker pattern 92. On the other hand, an over-correction such as a pin cushion distortion is obtained as shown in the checker pattern 93 when a distortion correction table made for a long range distance is used for the distortion correction and an under-correction such as a barrel distortion is obtained as shown in the checker pattern 91 when a distortion correction table made for a short range distance is used for the distortion correction.

In this embodiment, the distortion correction is done by the corrective computation means with the distortion correction tables. However, it is possible to carry out the distortion correction using a mathematical function that presents distortion in a general approximation. In order to support the distortion correction over the distances progressively determined before hand and the distortion correction against the difference of the cameras, plural functions are used as the distortion correction means. In addition, the distortion correction table 31 can be used for both camera CR and CL if they are designed in the same specification and the manufacturing deviation between two cameras is negligible small.

The directional mapping table 32 is, as shown in FIG 2(b), to show the correspondence between the coordinative position (u', v') of the picture element on the corrected image and the incidental angle of the light, being emitted from a light spot in the space to be viewed by the cameras 10, to a reference point on the optical axis which is penetrating a certain reference plane in the optical system of the cameras 10. The definition of the incidental angles $\alpha 1$, $\alpha 2$, $\gamma$ is as follows.

$\alpha 1$: the horizontal deviation angle from the optical axis MR of the camera CR regarding the horizontal plane projection of the vector D1 expanding from the reference point to the object OB $\gamma$: the vertical deviation angle from the optical axis MR of the camera CR regarding the vertical plane projection of the vector D1 expanding from the reference point to the object OB $\alpha 2$: the horizontal deviation angle from the optical axis ML of the camera CL regarding the horizontal plane projection of the vector D2 expanding from the reference point to the object OB $\gamma$: the horizontal deviation angle from the optical axis ML of the camera CL regarding the horizontal plane projection of the vector D1 expanding from the reference point to the object OB The corrective computation means 40 eliminates the distortion of each acquired image taken by the camera CR or CL by using the distortion correction tables 31. The distortion correction tables 31 are made for each of the cameras CR and CL, and each of the progressively predetermined ranging distances. The corrected images are made for all these distances and for these cameras 10.

Figure 4:
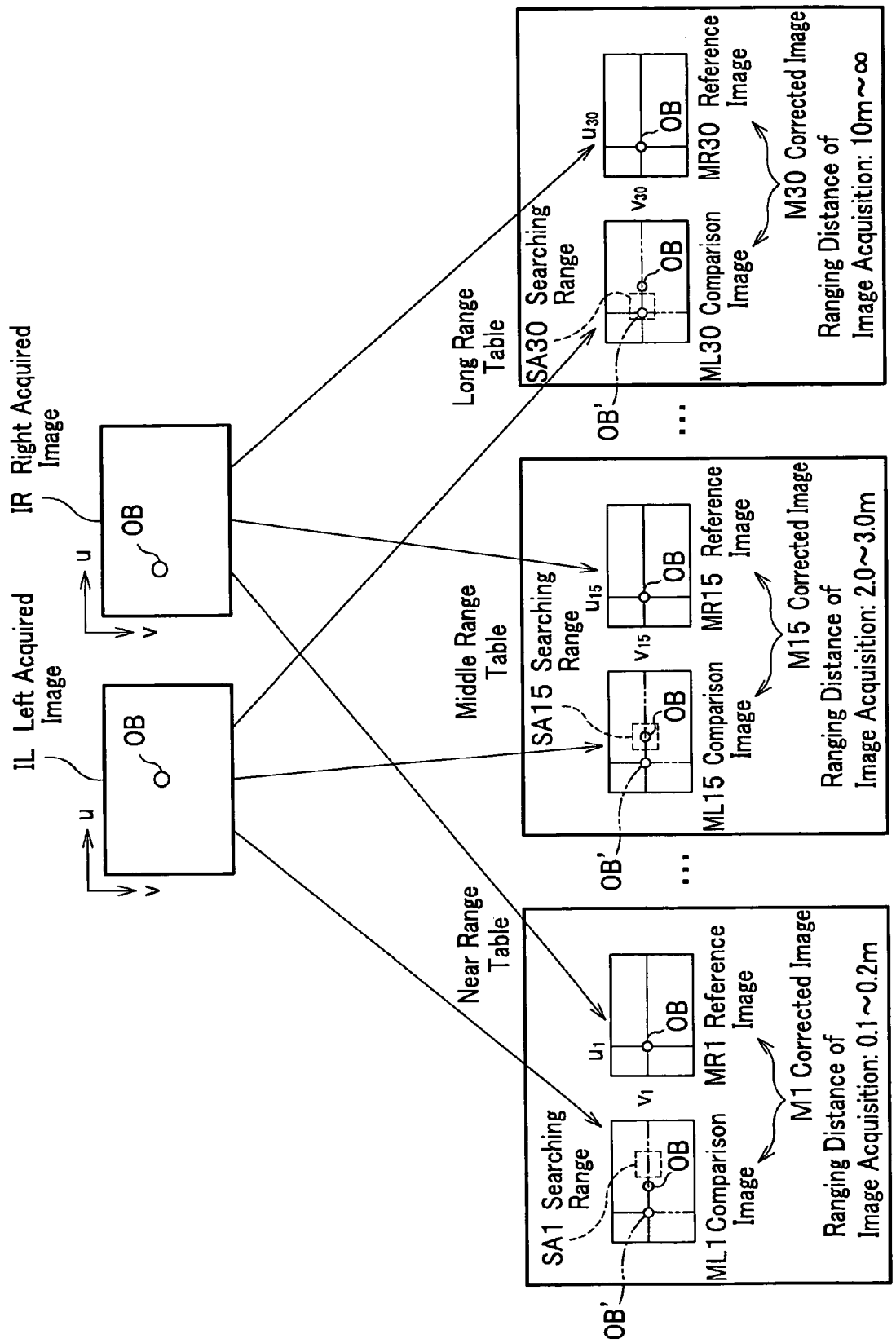
FIG. 4 is a diagram that shows an example of the distortion correction and the selection of the corrected image.

The process of making such corrected images is shown in FIG. 4. There are two acquired images; the right acquired image IR taken by the right camera and the left acquired image IL taken by the left camera. The corrected images as M1, M2, . . . , M15, . . . , M30 are made for the right acquired images and the left acquired images and therefore sixty corrected images are made in total. These corrected images are stored in the memory device 30.

The corrected image selection means 50 in FIG. 1 retrieves the plural corrected images M1 to M30 that the corrective computation means 40 has made from the memory device 30. The corrected image Mn (n: an integer from 1 to 30) which is most appropriately corrected of the distortion is selected by the corrected image selection means 50.

As shown in FIG. 4, the corrected images of the right acquired image IR by using the distortion correction table 31 are called reference images as MR1 to MR30 and the corrected images of the left acquired image IL are called comparison image ML1 to ML30. The corrected image M1 to M30 are generated by the different distortion correction tables 31 by means of the corrective computation means. For example, the corrected image M1 is generated by using a short ranging distance table for 0.1 to 0.2 meters, the corrected image M15 is generated by using a middle ranging distance table for 2.0 to 3.0 meters and the corrected image M30 is generated by using a long ranging distance table for 30 meters to infinity. The suffix numbers of the reference images and the comparison images imply that the same distortion correction under the same ranging distance of the object is applied for both the reference image and the comparison image if the suffix number is same.

The corrected images M1 to M30 are corrected by the distortion correction tables 31 which are made for different ranging distances. Therefore, if a certain corrected image Mn is corrected by the distortion table 31 made for an appropriate ranging distance, the object OB taken in the reference image MRn (n: an integer for 1 to 30) should be taken at a shift of the parallax in the right direction in the corresponding comparison image MLn. Therefore, it is possible to search the object in the picture elements which are deviated by the shift amount of the parallax explained above and to evaluate the appropriateness of the corrected image Mn by quantitative analysis of the coincidence of the object.

The process to compute the coincidence is carried out as follows. FIG 4 shows an example to explain the coincidence computation. The reference image MR1 is corrected by the distortion correction table 31 with ranging distance of 0.1 to 0.2 meters. If the image of the object OB locates in (u1, v1) in the reference image MR1, the object OB locates with a shift of parallax in the comparison image. Therefore the searching range SA1 is largely shifted in the right direction against the location of the picture element OB' in the comparison image ML1 because the OB location as (u1, v1) is mapped in such a shifted area if the ranging distance is for 0.1 to 0.2 meters. The height of the searching range SA1 is determined to cover the object OB in the comparison image. It is not necessary to set large height since there is no parallax in the vertical direction.

The reference image MR15 is corrected by the distortion correction table 31 for the ranging distance 2.0 to 3.0 meters. If the image of the object OB locates in (u15, v15) in the reference image MR15, the object OB locates with a shift of parallax in the comparison image. Therefore the searching range SA15 is more or less shifted in the right direction against the location of the picture element OB' in the comparison image ML15 because the OB location as (u15, v15) is mapped in such a shifted area in the right direction if the ranging distance is for 2.0 to 3.0 meters.

In the same way, the reference image MR30 is corrected by the distortion correction table 31 for the ranging distance 10 meters to infinity. If the image of the object OB locates in (u30, v30) in the reference image MR30, the object OB locates with a small shift of parallax in the comparison image. Therefore the searching range SA30 is quite little shifted in the right direction against the location of the picture element OB' in the comparison image ML30 because the OB location as (u30, v30) is mapped in such a shifted area in the right direction if the ranging distance is for 10 meters to infinity.

The heights of the searching range SA15 and SA30 are determined to cover the object OB in the comparison image. It is not necessary to set large height since there is no parallax in the vertical direction.

Figure 5:
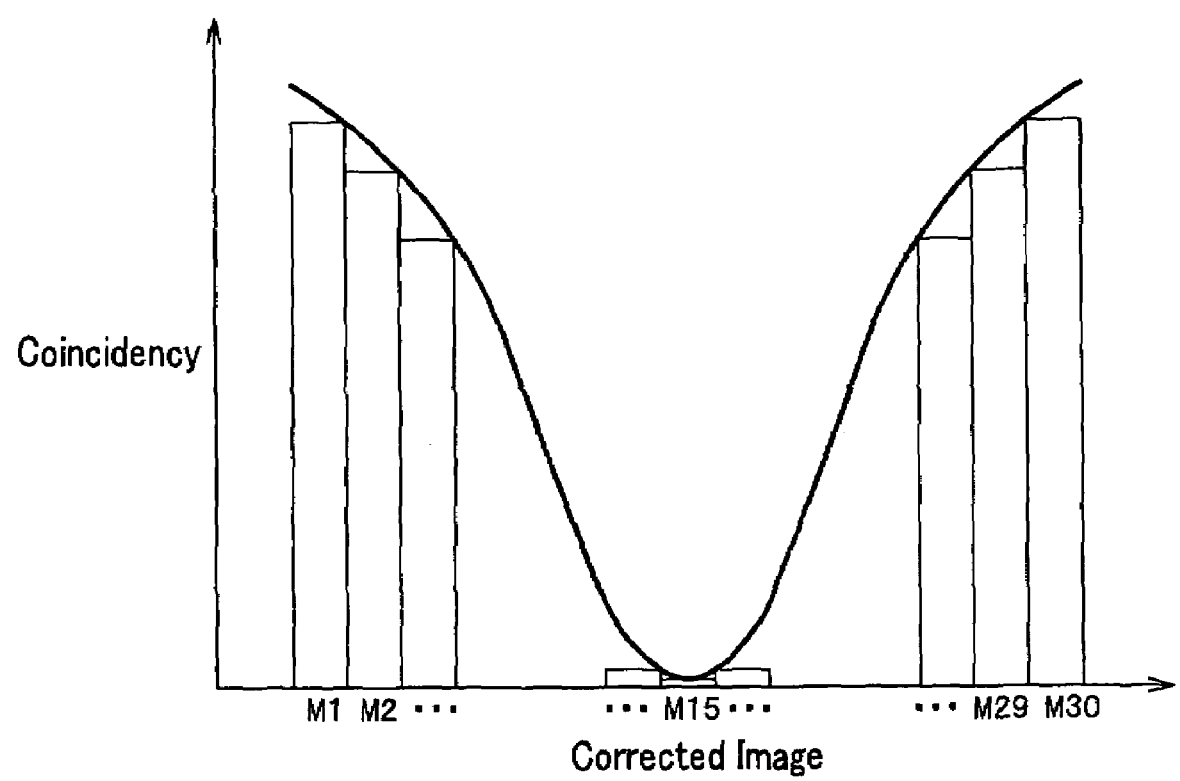
FIG 5 is a chart showing the results of coincidence against the corrected images.

The coincidence is computed as the summation of the difference (absolute value) of the coordinates of the picture element between the object position in the reference image MR1 to MR30 and the corresponding position in the searching range SA1 to SA30 in the comparison image ML1 to ML30. FIG. 5 shows an example of the coincidency of the object between the reference images and the comparison images as a function of ranging distance which features the suffix numbers of the corrected images. For all of the evaluation, there is the lowest difference value in a certain corrected image Mn (for example, M15 in FIG. 15). Therefore, M15 is the most appropriately corrected image. Then the corrected image selection means selects the corrected image M15 (in other words, the reference image MR15 and the comparison image ML15).

The ranging computation means 60 is to calculate the raging distance to the object based on the corrected image Mn. More concrete process is as follows in this embodiment. The coordinates of the object in the selected reference image MRn and the corresponding comparison image MLn are specified and computes the angles $\alpha_1$, $\alpha_2$, $\gamma$ using the coordinates (u', v') of the picture element using the directional mapping table 32.

Figure 6:
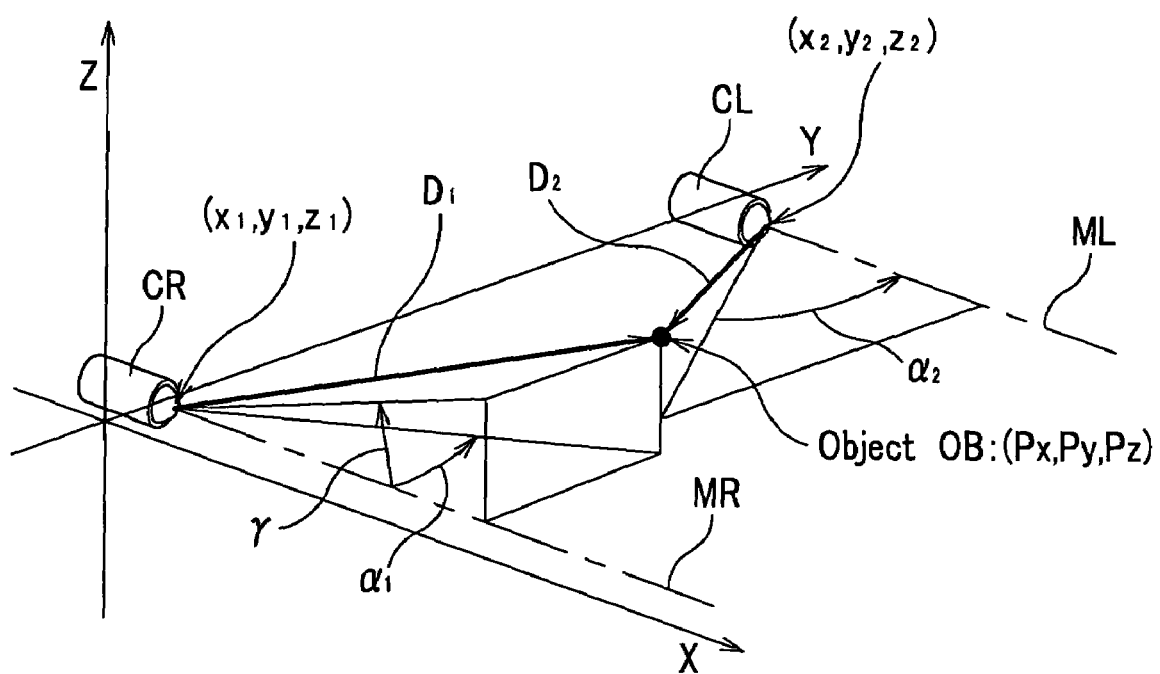
FIG 6 is a diagram showing the spatial relation of the viewing angles to determine the ranging distance of the object.

With reference to FIG. 6, the spatial position (Px, Py, Pz) of the object is calculated using the following equations.

$$Px = (x_1 \tan\alpha_1 - y_1 - x_2 \tan\alpha_2 + y_2)/(\tan\alpha_1 + \tan\alpha_2) \quad (1)$$

$$Py = (Px - x_1)\tan\alpha_1 + y_1 \quad (2)$$

$$Pz = (Px - x_1)\tan\gamma + z_1 \quad (3)$$

where, (x1, y1, z1) is a reference point of the optical system of the camera CR and (x2, y2, z2) is that of the camera CL. In this embodiment, the quantity (Px−x1) is the ranging distance of the object OB.

In the present embodiment, the ranging computation means 60 computes the distance to the object OB by the geometrical calculation given in the equations (1) to (3). However it is possible to determine the distance to the object OB using the parallax obtained in the reference image MRn and the comparison image MLn (which are the right image and the left image) after specifying the position of the object OB in these images.

All of the means used in the present ranging apparatus as the image input means 20, the corrective computation means 40, the corrected image selection means 50 and the ranging computation means can be realized with a computer program by which the central processors in the computer, graphic processors and image scanners cooperate for the designated processes and purposes. The distortion correction tables 31 are constructed in a data base that facilitates a simple retrieval operation. Collectively, this is indicated by the boxed section 2 in FIG. 1.

Figure 7:
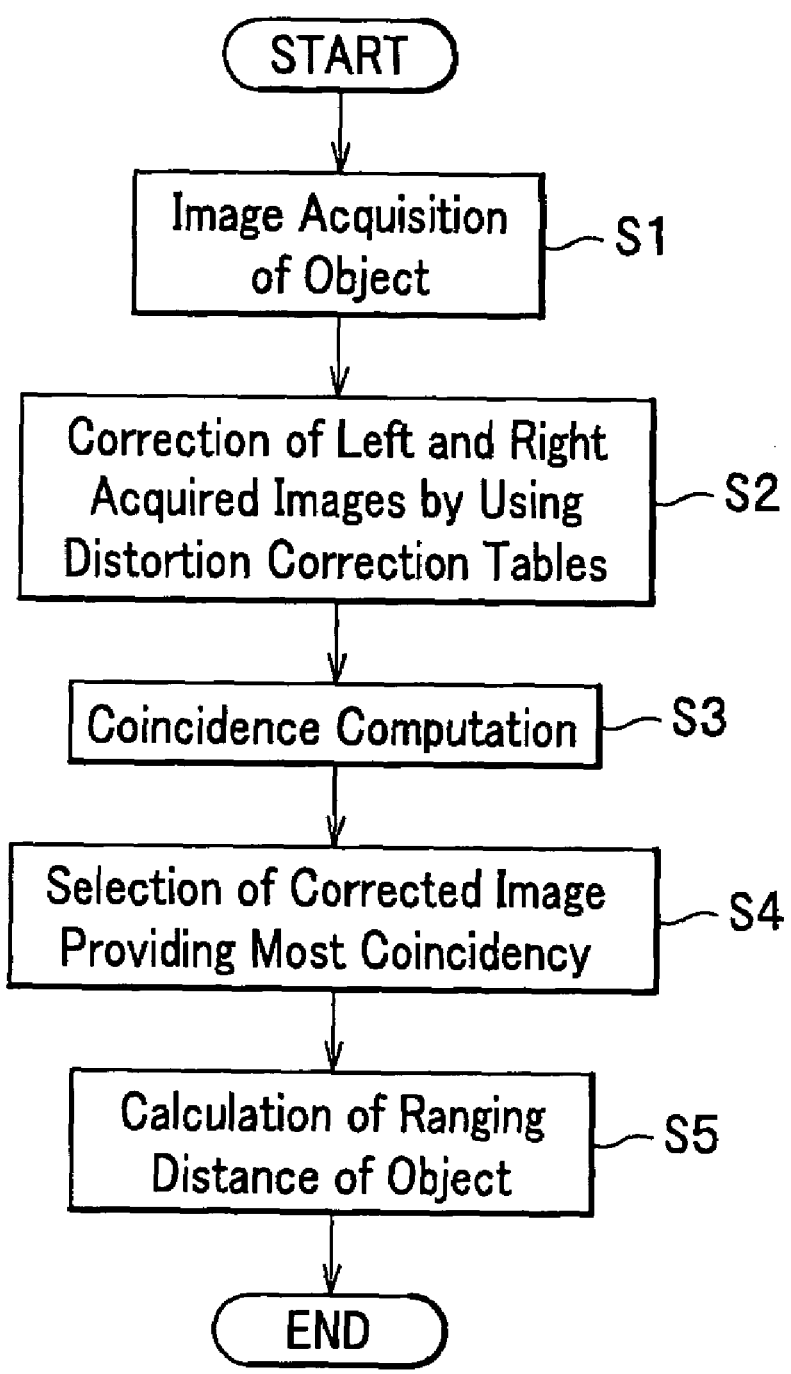
FIG. 7 is the flow chart that shows a process to compute the ranging distance.
Figure 8:
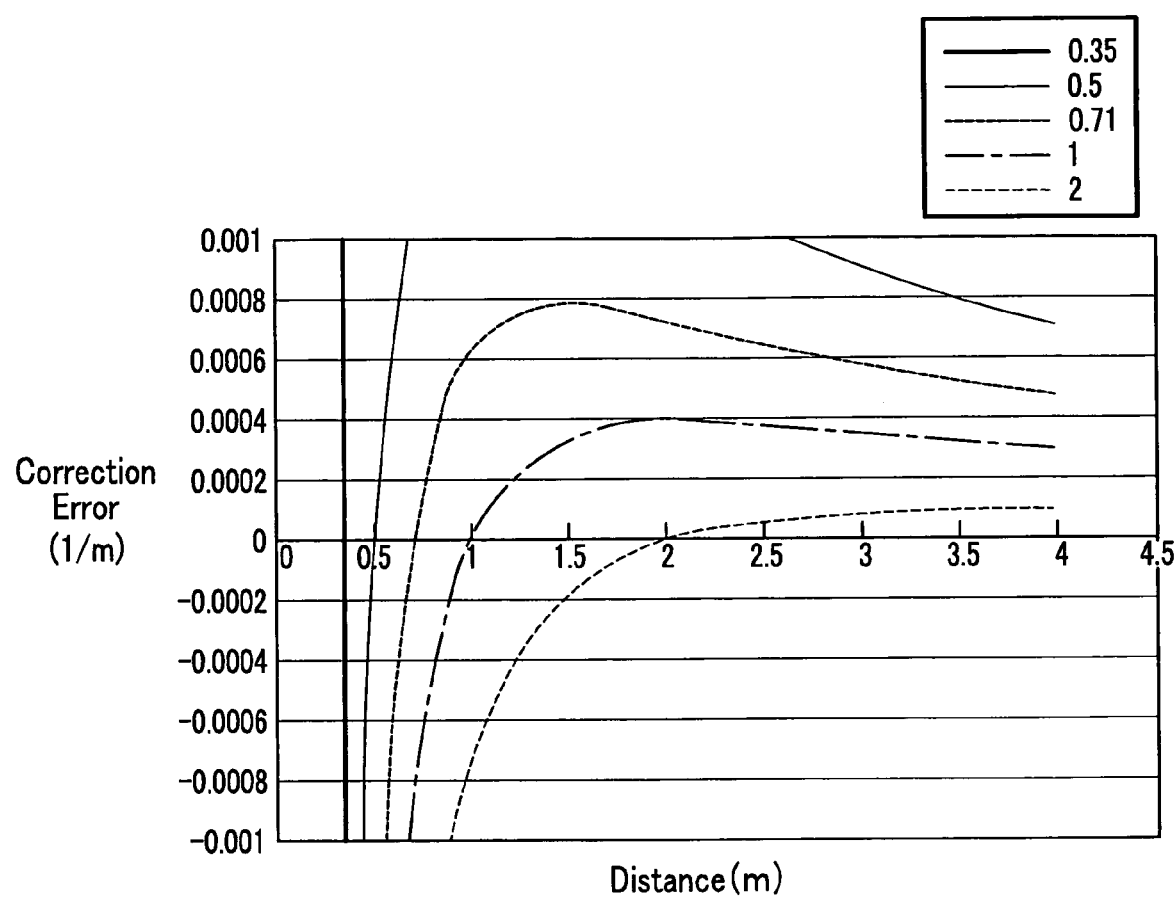
FIG. 8 is a chart showing the correction errors generated after the conventional calibration.

The operation of the ranging apparatus 1 is explained using the flow chart shown in FIG. 7.

To begin with, the image of the object OB is acquired by the cameras 10 (camera CR and CL) and the right acquired image IR and the left acquired image IL are obtained (step S1). As shown in FIG. 4, the corrected images M1 to M30 (the reference images MR1 to MR30 and the comparison images ML1 to ML30) are generated by using all distortion correction tables 31 (step S2).

The object is searched in the searching ranges SA1 to SA30 in the comparison image ML1 to ML30. The coincidences between the object OB in all reference images MR1 to MR30 which have been corrected by the distortion correction tables 31 and the object OB in the corresponding searching ranges SA1 to SA30 are computed (step S3).

In the next step, the corrected image selection means compares all coincidences computed for all reference images and selects the corrected image (therefore, Mn) so that the object in the corrected image and the object in the searching range are most coincidental each other (step S4).

Based on the coordinates of the object OB in the corrected image Mn, the directions to the object from the cameras CR and CL are determined. Finally, the ranging distance to the object can be obtained by the calculation using equations (1) to (3) (step S5).

According to the ranging apparatus in the present embodiment, the precise ranging distance can be determined from the images of the object acquired by the cameras CR and CL since the most appropriate correction is applied to the acquired image of the object in response to the distance thereto. In selecting one of the corrected images M1 to M30, it is possible to select the corrected image Mn by small amount of computation since the coincidence computation is carried over the small areas as SA1 to SA30 (determined by the parallax of the two cameras) where the object should exist if the corrected images M1 to M30 are appropriately corrected.

Although there has been disclosed what is the present embodiment of the invention, it will be understood by persons skilled in the art that variations and modifications may be made thereto without departing from the scope of the invention, which is indicated by the appended claims. For example, the object is not limited to the marker which is selected for the object OB in the present embodiment but the persons' figures, the still objects and other materials can be adopted. In order to specify these objects of which images are acquired by the camera CR and CL, a contour extraction means may be used.

As explained, it is possible to precisely compute the ranging distance of the object by using the images acquired by the cameras since the deformation of the image is appropriately corrected by this invention.

What is claimed is:

1. A ranging apparatus which determines distances to objects by using planar positions of said objects in images which are obtained by plural image acquiring devices comprising:

plural cameras that function as said plural image acquiring devices, plural distortion correction devices to correct distortion of images taken by said cameras wherein said plural distortion correction devices progressively determine ranging distances of a target object, a corrective computation device which generates corrected images by using said distortion correction devices, being corrected for eliminating distortion caused by optical systems used for said cameras, corresponding to said progressively determined ranging distances in which said images are taken by said image acquiring devices, a corrected image selection device which selects a most appropriately corrected image among said corrected images and;

a ranging computation device which computes a distance to said object viewed in said corrected image selected by said corrected image selection device.

2. A ranging apparatus according to claim 1, wherein said corrected image selection device selects a corrected image which has best coincidency between said object specified in reference images which are corrected images, being generated by said corrective computation device, of said acquired images taken by one of said cameras and said object specified in comparison images which are corrected images, being generated by said corrective computation device, of said acquired images taken by another of said cameras, of which said coincidency is evaluated for picture elements that compose an image of said object in said reference image against an image of said object that is searched over picture elements, being included in said comparison image, corresponding to an area shifted by a parallax to said object given for said progressively determined ranging distance in which said reference image and said comparison image are generated.

3. A ranging method which determines distances to objects by using planar positions of said objects in images which are obtained by cameras comprising:

a first step wherein said cameras take images of a target object, a second step wherein plural corrected images are generated from images acquired by said cameras after eliminating distortion caused by optical systems of said cameras, wherein said distortion is computed by plural distortion correction devices which progressively determine ranging distances of said object, a third step wherein a corrective image is selected among plural corrective images generated in said second step; and a fourth step wherein ranging distance to said object in said corrected image selected in said third step is computed.

4. A ranging program by which a computer system determines distances to objects by using planar positions of said objects in images which are obtained by cameras, wherein said ranging program includes operations of:

correcting distortion of images taken by cameras using plural distortion correction devices, wherein said plural distortion correction device progressively determine ranging distances of a target object, generating corrected images using said distortion correction devices, being corrected for eliminating distortion caused by optical systems of said cameras, corresponding to said progressively determined ranging distances in which said images are taken by said cameras, selecting a most appropriately corrected image among said corrected images and;

computing a distance to said object viewed in said selected corrected image.

5. A ranging method according to claim 3, wherein;

said third step involves selecting a corrected image which has best coincidency between said object specified in reference images which are corrected images, being generated in said second step, of said images taken by one of said cameras in said first step and said object specified in comparison images which are corrected images, being generated in said second step, of said images taken by another of said cameras, of which said coincidency is evaluated for picture elements that compose an image of said object in said reference image against an image of said object that is searched over picture elements, being included in said comparison image, corresponding to an area shifted by a parallax to said object given for said progressively determined ranging distance in which said reference image and said comparison images are generated.

6. A ranging program according to claim 4, wherein;

said selecting operation selects a corrected image which has best coincidency between said object specified in reference images which are corrected images, being generated in said generating operation, of said images taken by one of said cameras and said object specified in comparison images which are corrected images, also generated in said generating step, of said images taken by another of said cameras, of which said coincidency is evaluated for picture elements that compose an image of said object in said reference image against an image of said object that is searched over picture elements, being included in said comparison image, corresponding to an area shifted by a parallax to said object given for said progressively determined ranging distance in which said reference image and said comparison image are generated.

7. A ranging apparatus according to claim 1, wherein said distortion correction devices comprise a distortion correction table prepared in advance for said cameras.

8. A ranging apparatus according to claim 1, wherein said distortion correction devices comprise distortion correction tables prepared in advance for said cameras, respectively.

9. A ranging method according to claim 3, wherein said distortion correction devices comprise a distortion correction table prepared in advance for said cameras.

10. A ranging method according to claim 3, wherein said distortion correction devices comprise distortion correction tables prepared in advance for said cameras, respectively.

11. A ranging program according to claim 4, wherein said distortion correction devices comprise a distortion correction table prepared in advance for said cameras.

12. A ranging program according to claim 1, wherein said distortion correction devices comprise distortion correction tables prepared in advance for said cameras, respectively.

* * * * *